US 12,065,959 B2

(12) United States Patent
Ernst et al.

(10) Patent No.: US 12,065,959 B2
(45) Date of Patent: Aug. 20, 2024

(54) THERMAL MANAGEMENT OF EXHAUST GAS WITH CHARGE AIR HEATING

(71) Applicant: Cummins Inc., Columbus, IN (US)

(72) Inventors: Timothy C. Ernst, Columbus, IN (US); Daniel J. Mohr, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/930,838

(22) Filed: Sep. 9, 2022

(65) Prior Publication Data

US 2024/0084727 A1    Mar. 14, 2024

(51) Int. Cl.
| F02B 29/04 | (2006.01) |
| F02B 29/02 | (2006.01) |
| F02M 26/04 | (2016.01) |
| F02M 26/17 | (2016.01) |

(52) U.S. Cl.
CPC .......... *F02B 29/0418* (2013.01); *F02B 29/02* (2013.01); *F02B 29/0443* (2013.01); *F02M 26/04* (2016.02); *F02M 26/17* (2016.02)

(58) Field of Classification Search
CPC .. F02B 29/0418; F02B 29/02; F02B 29/0443; F02M 26/04; F02M 26/17
See application file for complete search history.

(56) References Cited

U.S. PATENT DOCUMENTS

| 9,644,573 | B2 | 5/2017 | Dale |
| 9,739,194 | B2 | 8/2017 | Kuske et al. |
| 11,060,468 | B2 | 7/2021 | Kolhouse et al. |
| 11,125,139 | B2 | 9/2021 | Ernst et al. |
| 2008/0149080 | A1* | 6/2008 | Reuss .................... F02M 26/25 |
| | | | 123/568.21 |
| 2019/0249589 | A1* | 8/2019 | Ernst ....................... F25B 27/02 |
| 2021/0108580 | A1* | 4/2021 | Kolhouse ............. F02M 31/042 |

FOREIGN PATENT DOCUMENTS

| EP | 2088298 A2 | 8/2009 | |
| EP | 2097628 B1 | 9/2018 | |
| FR | 3026143 A1 * | 3/2016 | ......... B60H 1/00271 |

OTHER PUBLICATIONS

Machine Translation of FR 3026143 A1 to Lefebvre (Lefebvre). (Year: 2016).*

* cited by examiner

*Primary Examiner* — Brandon D Lee
(74) *Attorney, Agent, or Firm* — Taft, Stettinius & Hollister LLP

(57) ABSTRACT

Heating of the charge air in an intake is provided by a working fluid that is circulated through the intake to exchange heat with the charge air. The heated charge air can be used in response to a thermal management condition for an exhaust gas produced by operation of the internal combustion engine.

16 Claims, 5 Drawing Sheets

THERMAL MANAGEMENT OF EXHAUST GAS WITH CHARGE AIR HEATING

FIELD OF THE DISCLOSURE

This disclosure relates generally to internal combustion engines, and more particularly to thermal management of exhaust gas produced by internal combustion engine operation with heating of the charge air to the internal combustion engine.

BACKGROUND

Aftertreatment devices are well known and widely used in various internal combustion engine applications for the treatment of engine exhaust gases. Aftertreatment devices such as oxidation catalysts, particulate filters, and selective catalytic reduction (SCR) devices have been useful for handling and/or removing controlled pollutants, including carbon monoxide, nitric oxide, unburned hydrocarbons, sulfur, and soot in the exhaust stream of a diesel engine.

Thermal management of the exhaust gas of an internal combustion engine can provide operational benefits such as more efficient and more effective aftertreatment device operations. Turbochargers with variable geometry (VG) inlets, exhaust throttles, intake throttles, exhaust gas recirculation bypass, late post-combustion heat injections, charge air cooler bypass, and/or electrical resistant heating, among others, have been used to decrease engine efficiency, reduce charge flow, and/or increase charge temperature to thermally manage the exhaust gas temperature. However, these techniques can also suffer from practical limitations in implementation due to combustion problems that may result such as high smoke and hydrocarbon emissions, inability to achieve target temperatures, and excessive inefficiency. Therefore, further improvements in this technology are needed.

SUMMARY

Systems, methods, and apparatuses for thermal management of exhaust gas are disclosed. More particularly, the charge air to the internal combustion engine is heated.

In an embodiment, there is a system for thermally managing an exhaust gas. The system includes an internal combustion engine including a plurality of cylinders. The system includes an exhaust for receiving the exhaust gas produced by combustion in the plurality of cylinders, and at least one aftertreatment device in the exhaust. The system also includes an intake that provides a charge air to the plurality of cylinders. The intake includes a charge air cooler (CAC) for cooling the charge air. A heat transfer system is configured to heat the charge air in the intake by a heat exchange to the charge air from a working fluid that is circulated through the intake.

In an embodiment, a method includes operating an internal combustion engine including a plurality of cylinders that receive a charge air from an intake, an exhaust that receives exhaust gas produced by combustion in at least a portion of the plurality of cylinders, and at least one aftertreatment device in the exhaust. The method includes determining a thermal management condition associated with operation of the internal combustion engine, and heating the charge air in the intake by a heat exchange to the charge air from a working fluid that is circulated through the intake in response to the thermal management condition.

In an embodiment, there is a heat transfer system for heating a charge air in an intake of an internal combustion engine. The heat transfer system includes charge air plumbing configured to provide the charge air to the intake of the internal combustion engine, and a heat pump loop configured to circulate a working fluid to heat the charge air in the charge air plumbing.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
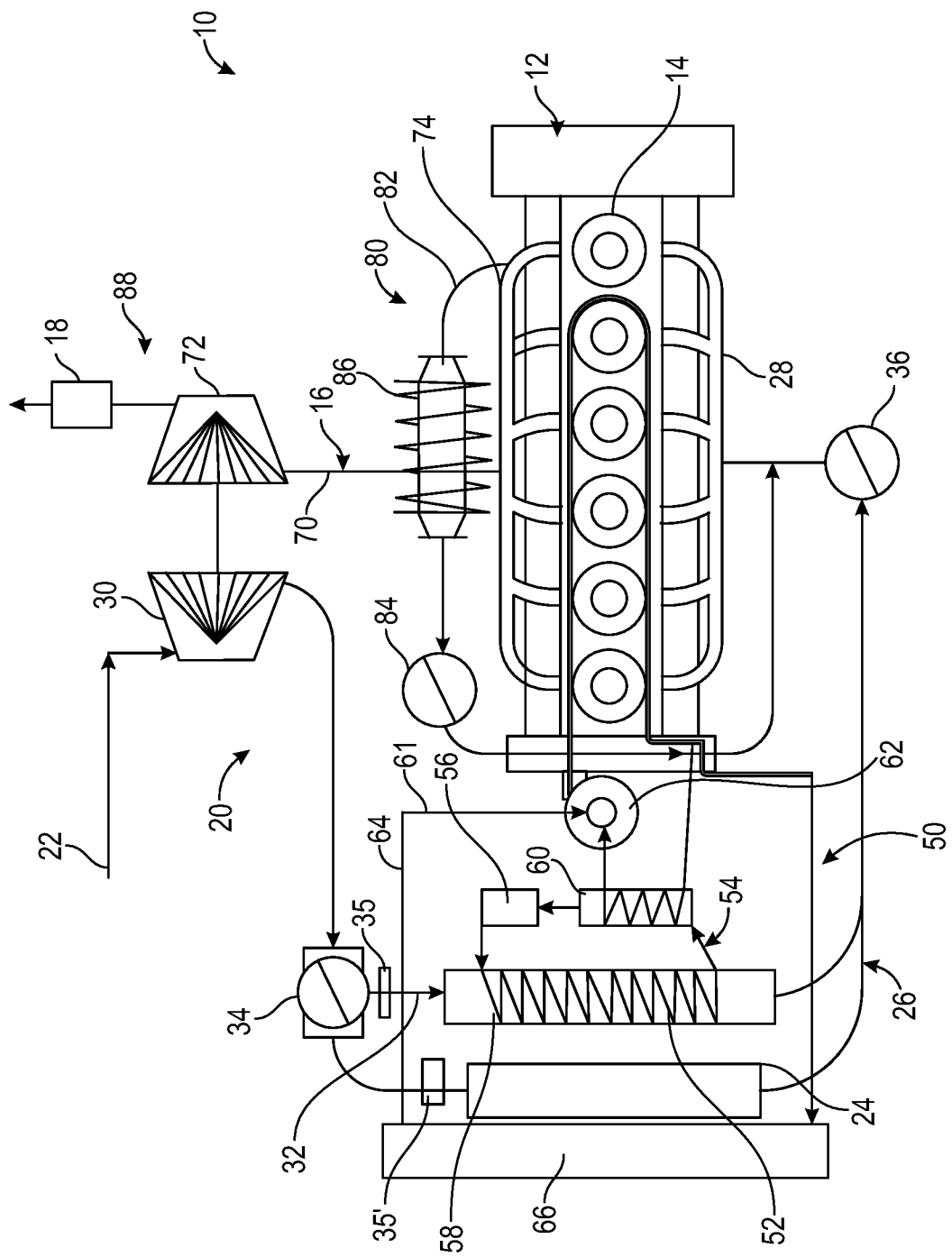
FIG. 1 is a schematic of an internal combustion engine system configured to thermally manage an exhaust gas output from an internal combustion engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIGS. 1-4, a system 10, 10' for thermally managing an exhaust gas of an internal combustion engine 12 including a plurality of cylinders 14 is provided. The system 10, 10' includes an exhaust 16 for receiving the exhaust gas produced by combustion in the plurality of cylinders 14, and at least one aftertreatment device 18 in the exhaust 16. System 10, 10' also includes an intake 20 that provides a charge air 22 to the plurality of cylinders 14. The intake 20 includes a CAC 24 for cooling the charge air 22. A heat transfer system 50, 50' is configured to heat the charge air 22 in the intake 20 by a heat exchange to the charge air 22 from a working fluid 52 that is circulated through the intake 20.

Figure 5:
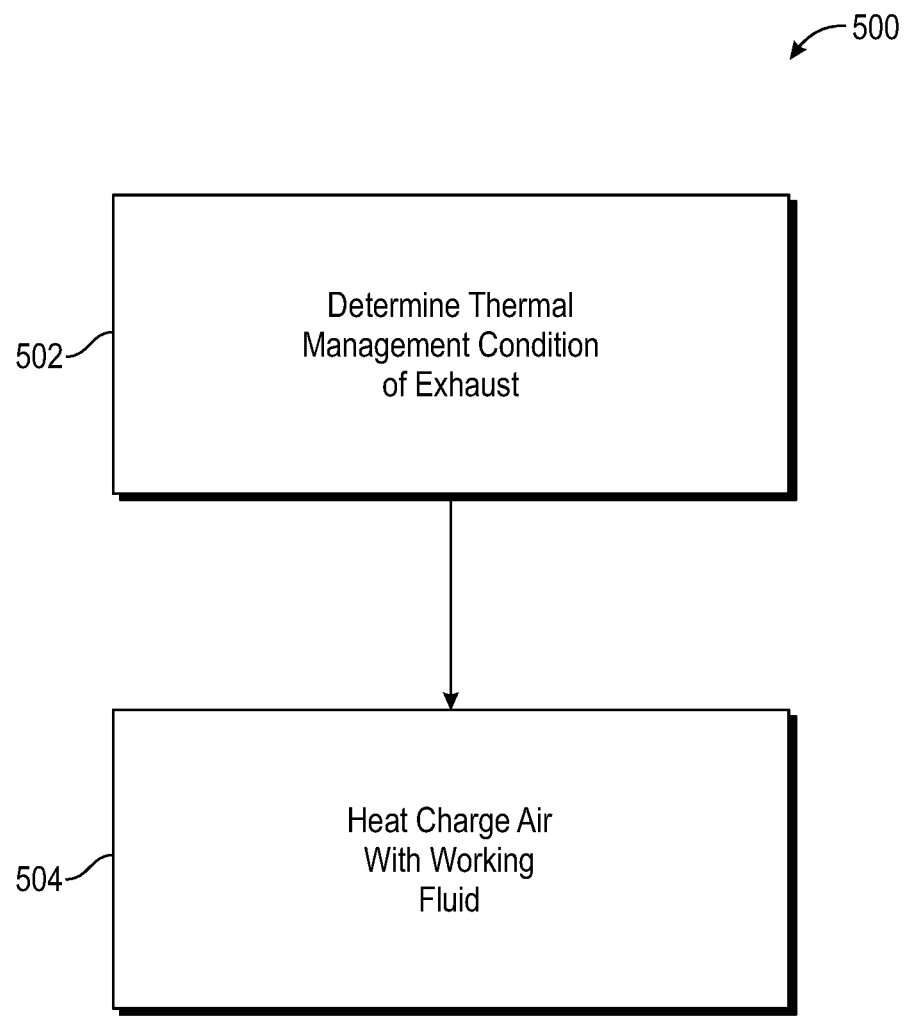
FIG. 5 is a flow diagram of one embodiment of a procedure for thermally managing the exhaust gas produced by an internal combustion engine.

With further reference to FIG. 5, a method 500 of thermally managing an internal combustion engine 12 with a plurality of cylinders 14 and at least one aftertreatment device 18 in an exhaust 16 is disclosed. The method 500 includes operating the engine 12 to receive a charge air 22 from an intake 20 and produce an exhaust gas by combustion in at least a portion of the plurality of cylinders 14. Method 500 includes, at operation 502, determining a thermal management condition associated with operation of the internal combustion engine 12, and, at operation 504, heating the charge air 22 by condensing a working fluid 52 that is circulated through the intake 20 in response to the thermal management condition.

A heat transfer system 50, 50' for heating a charge air 22 in an intake 20 of an internal combustion engine 12 is also provided. The heat transfer system 50, 50' includes charge air plumbing 26 configured to provide the charge air 22 to the internal combustion engine 12, and a heat pump loop 54, 54' configured to circulate a working fluid 52 to heat the charge air 22 in the charge air plumbing 26.

FIG. 1 illustrates an embodiment of the system 10 for thermally managing an exhaust gas. The system 10 includes internal combustion engine 12, intake 20 for providing charge air 22 to a plurality of cylinders 14, and exhaust 16 for receiving exhaust gas produced by combustion of the charge air 22 with fuel in the plurality of cylinders 14. Exhaust 16 includes one or more aftertreatment devices 18 for treating the exhaust gas to reduce emissions.

The one or more aftertreatment devices 18 herein means one or more devices useful for handling and/or removing material from exhaust gas that may be harmful constituents, including carbon monoxide, nitric oxide, nitrogen dioxide, hydrocarbons, and/or soot in the exhaust gas. In some examples, the one or more aftertreatment devices 18 can include at least one of a catalytic device and a particulate matter filter. The catalytic device can be a diesel oxidation catalyst (DOC) device, ammonia oxidation (AMOX) catalyst device, a selective catalytic reduction (SCR) device, three-way catalyst (TWC), lean NOX trap (LNT), etc.

FIG. 1 shows the engine 12 including the plurality of cylinders 14 in an arrangement that includes six cylinders in an in-line arrangement for illustration purposes only. Any number of cylinders and any arrangement of the cylinders suitable for use in an internal combustion engine can be utilized. The number of cylinders 14 that can be used can range from one cylinder to eighteen or more. For example, in FIG. 2 engine 12 is shown with six cylinders 14. Each cylinder 14 typically houses a piston (not shown) that is rotatably attached to a crankshaft (not shown) that is rotated by reciprocal movement of the piston in the corresponding cylinder 14. Typically each cylinder 14 also includes at least one intake valve, at least one exhaust valve, and a fuel injector that provides fuel to a combustion chamber formed by the cylinder 14

The charge air 22 is provided to engine 12 through charge air plumbing 26 of intake 20. Charge air plumbing 26 includes an intake manifold 28 that distributes the charge air 22 to the cylinders 14, a CAC 24 upstream of intake manifold 28, and a turbo-compressor 30 upstream of CAC 24. Charge air plumbing 26 may also include a CAC bypass 32 and a three-way valve 34 that connects the outlet of compressor 30 to CAC 24 and CAC bypass 32. In another embodiment, three-way valve 34 is omitted and a two-way valve 35 in bypass 32 allows some charge air to bypass CAC 24. In another embodiment, there is a first two-way valve 35 in CAC bypass 32 and a second two-way valve 35' in the leg that includes CAC 24.

Charge air plumbing 26 may also include an intake throttle 36 upstream of intake manifold 28 and downstream of CAC 24 and CAC bypass 32. The intake throttle 36 can be controlled to influence the charge air flow into the cylinders 14.

The CAC 24 can decrease a temperature of the charge air 22 and increase a charge density to provide more charge air 22 to the cylinders 14. In one example, the CAC 24 uses air as a cooling media. In another example, the CAC 24 is a low temperature aftercooler (LTA). The LTA uses coolant as the cooling media.

The exhaust gas flows out from the cylinders 14 into an exhaust passage 70 of exhaust 16. Exhaust 16 includes a turbine 72 connected to exhaust passage 70. Turbine 72 drives compressor 30 with exhaust gas flow through turbine 72. Exhaust 16 may include a wastegate (not shown) that enables part of the exhaust gas to by-pass the turbine 72. In another embodiment, turbine 72 is a variable geometry turbine with an adjustable inlet to control the flow of exhaust gas therethrough. The exhaust 16 can further or alternatively include an exhaust throttle (not shown) for adjusting the flow of the exhaust gas through the exhaust passage 70. The exhaust gas, which can be a combination of by-passed and turbine flow, then enters the aftertreatment device 18.

Optionally, a part of the exhaust gas in the exhaust passage 70 can be recirculated into the intake 20 via an exhaust gas recirculation (EGR) loop 80. The EGR loop 80 includes an EGR passage 82 that connects the exhaust passage 70 upstream of the turbine 72 to the intake 20 downstream of the intake throttle 36. Alternatively or additionally, a low pressure EGR system (not shown) can be provided downstream of turbine 72 and upstream of compressor 30. An EGR valve 84 can regulate the EGR flow through the EGR passage 82. The EGR passage 82 can be further provided with an EGR cooler 86. Although not shown, a bypass around EGR cooler 86 can also be provided in some embodiments.

In the illustrated embodiment, charge air 22 is admitted into a common intake manifold 28, and exhaust gases are expelled into a common exhaust manifold 74. Other embodiments contemplate split exhaust manifolds and/or split intake manifolds. In the illustrated embodiment, a single stage turbocharger 88 is shown. Other embodiments contemplate multi-stage turbochargers, electronic compressors or superchargers, or no turbocharging components.

System 10 also includes heat transfer system 50 configured to increase the temperature of the charge air 22 in response to a thermal management condition for the exhaust gas. The thermal management condition for the exhaust gas can be, for example, any condition in which an increase in exhaust gas temperature is desired from a current temperature.

In one instance, one or more operating conditions of system 10 are adjusted so as to achieve one or more target conditions of the exhaust gas in response to the thermal management condition. In some examples, the target condition of the exhaust gas enables effective or more efficient operation of the one or more aftertreatment devices 18 such that a minimum desired or target operating temperature is obtained and/or maintained. In some examples, the target condition of the exhaust gas enables regeneration of the one or more aftertreatment devices 18. Regeneration of the aftertreatment device means desorbing hydrocarbons and/or removing particulate matter and/or removing reversible poisons/aggregates accumulated in the aftertreatment device that can influence the performance or lead to damage of the aftertreatment device. In other implementations, when the target condition for the exhaust gas is achieved, material from exhaust gas accumulated in the one or more aftertreatment devices 18 can be removed effectively.

In some examples, the target condition for the exhaust gas is a target temperature of the exhaust gas or exhaust component at a particular position in the exhaust 16. In one specific example, the target temperature is a range of temperatures of the exhaust gas/component at the one or more aftertreatment devices 18 and/or turbine 72.

In some instances, the target condition is an exhaust gas/component temperature in a range above about 200° C. In another instance the target condition is an exhaust gas temperature in a range between 250° C. and 300° C. In another example, the target temperature condition can range from 400° C. to 650° C. In other examples, the target condition is a temperature above 280° C., above 400° C., and above 500° C.

Heat transfer system 50 includes heat pump loop 54 for circulating working fluid 52 to intake 20 to heat charge air 22. Heat pump loop 54 includes a working fluid compressor 56, a condenser 58, and an evaporator 60. In the illustrated embodiment, condenser 58 is located in CAC bypass 32. However, condenser 58 could be located in other portions of intake 20.

Figure 2:
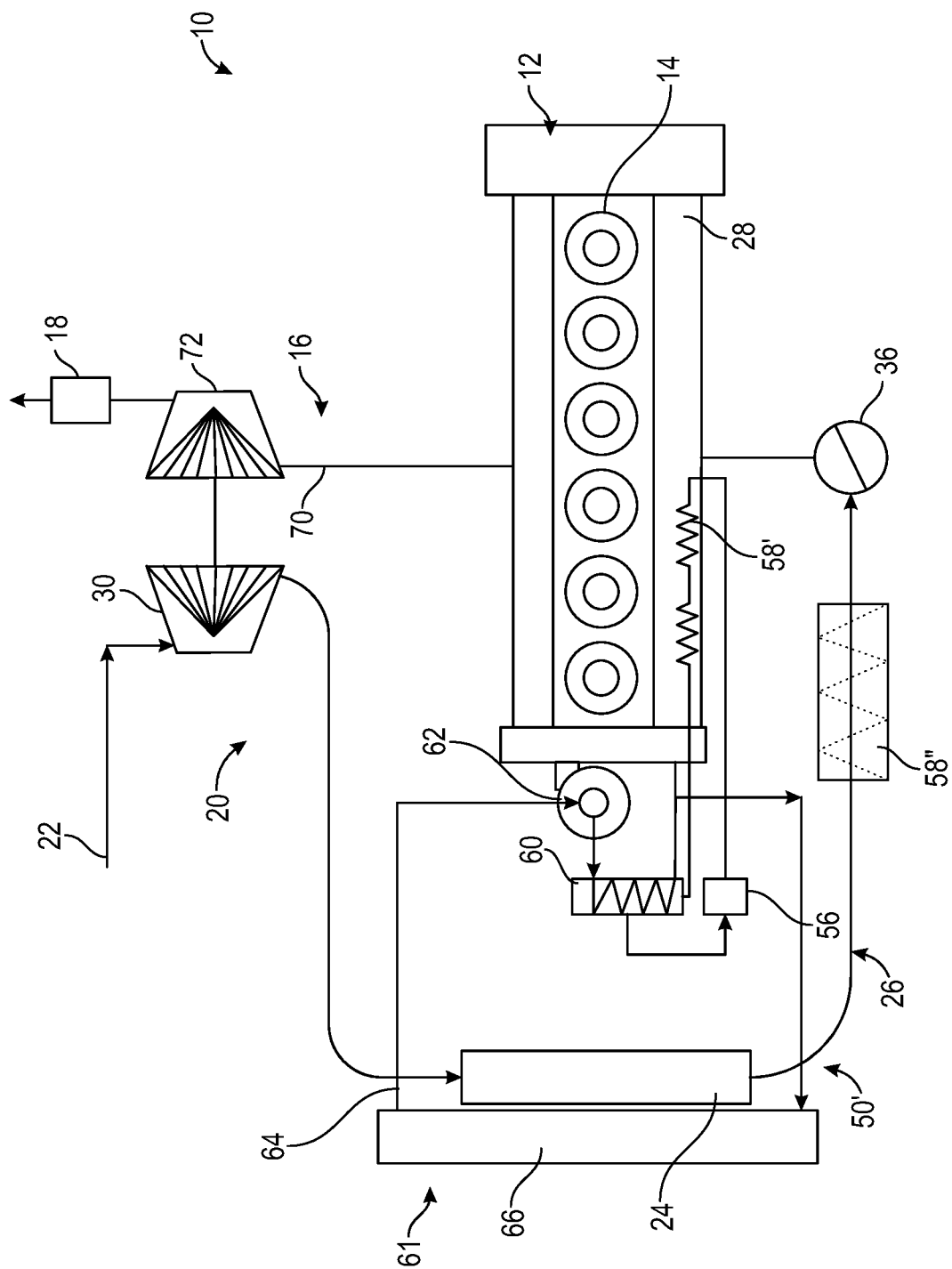
FIG. 2 is a schematic of another embodiment internal combustion engine system configured to thermally manage an exhaust gas output from an internal combustion engine.

For example, FIG. 2 shows another embodiment of system 10, designated as system 10'. System 10' does not include a CAC bypass 32, although a CAC bypass is not precluded by system 10'. In one embodiment, system 10' includes a condenser 58' located in intake manifold 28. Alternatively, a condenser 58" can be located downstream of CAC 24 and upstream of intake manifold 28 in charge plumbing 26.

Heat transfer system 50 also includes a heat transfer loop 61 transferring heat into working fluid 52. Heat transfer loop 61 circulates a heating fluid 64 that can receive heat from any suitable heat source, such as heat generated by operation of engine 12. Examples include ambient air, engine coolant, engine oil, or other fluid that is heated by operation of engine 12. In the illustrated embodiment, the heat source for heating fluid 64 is engine coolant.

Heat transfer loop 61 includes a pump 62 for circulating the heating fluid 64 through evaporator 60 to exchange heat with the working fluid 52. Heat transfer loop 61 also includes a radiator 66 for further cooling the heating fluid 64 with ambient air or other cooling source or media.

Figure 3:
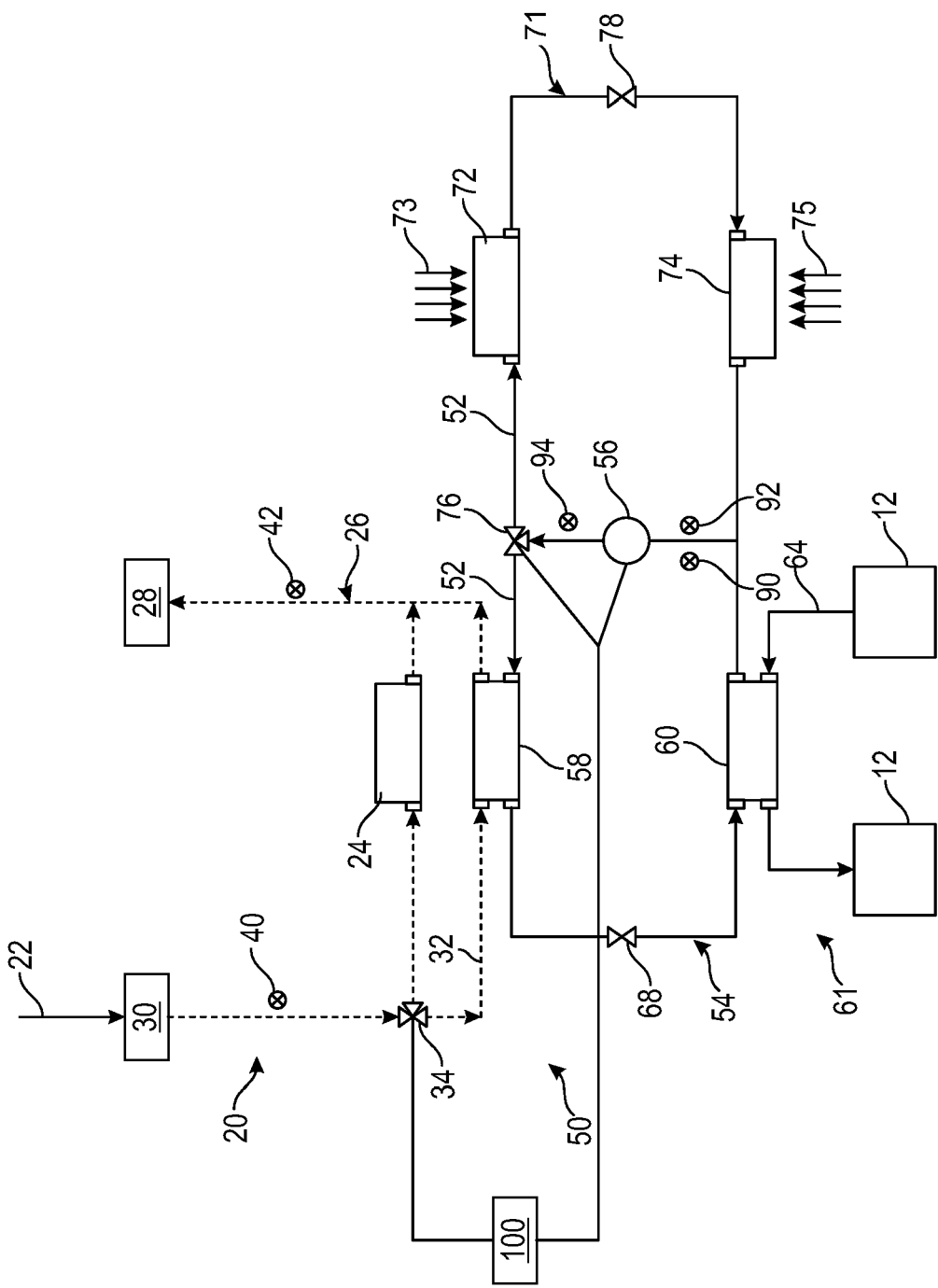
FIG. 3 is a schematic diagram of a heat transfer system for increasing a temperature of a charge air in an intake of an internal combustion engine.

Referring to FIG. 3, further details of one embodiment of heat transfer system 50 is shown. Heat transfer system 50 includes heat pump loop 54 for providing working fluid 52 to intake 20 to heat charge air 22. Heat pump loop 54 includes working fluid compressor 56, condenser 58, and evaporator 60 as discussed above. In the illustrated embodiment, condenser 58 is located in CAC bypass 32, but could be in other locations in intake 20. A compressor outlet temperature sensor 40 can be provided upstream of CAC 24 and CAC bypass 32. A CAC outlet temperature sensor 42 can be provided in intake 20 downstream of CAC 24 and CAC bypass 32.

In the FIG. 3 embodiment, heat pump loop 54 is integrated with a cabin air conditioning loop 71 of a vehicle (not shown). The cabin air conditioning loop 70 includes a second condenser 72 and a second evaporator 74. Second condenser 72 cools the working fluid with ram air flow 73, and second evaporator 74 cools the cabin air flow 75. Heat transfer loop 61 circulates heating fluid 64 through evaporator 60 to heat the working fluid 52 that is used for heating charge air 22.

Heat pump loop 54 and cabin air conditioning loop 71 share working fluid compressor 56. In an embodiment, working fluid compressor 56 is an on-engine, belt driven, air conditioning type compressor. However, other working fluid compressors are also contemplated. A low temperature sensor 90 and a low pressure sensor 92 may be provided upstream of working fluid compressor 56, and a high pressure sensor 94 may be provided downstream of working fluid compressor 56.

A three-way valve 76 is provided downstream of compressor 56 and between condensers 58, 72 to regulate the flow of working fluid 52 through the loops 54, 71, respectively. In addition, heat pump loop 54 may include a first thermal expansion valve 68 between condenser 58 and evaporator 60, and cabin air conditioning loop 71 may include second thermal expansion valve 78 between second condenser 72 and second evaporator 74. Thermal expansion valves 68, 78 may be passively controlled, or may be actively controlled.

Figure 4:
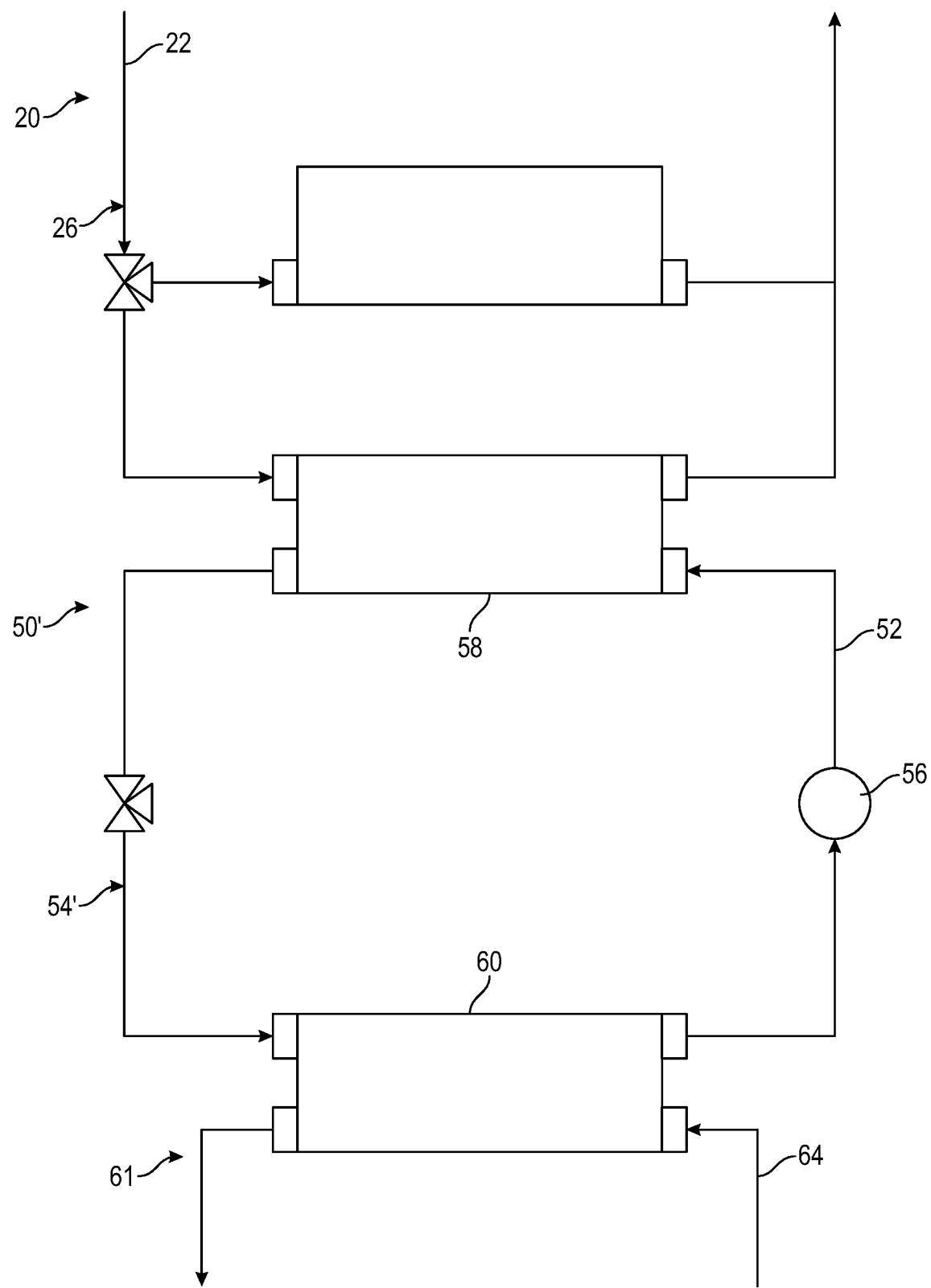
FIG. 4 is a schematic diagram of another embodiment heat transfer system for increasing a temperature of a charge air in an intake of an internal combustion engine.

In another embodiment shown in FIG. 4, heat transfer system 50' includes a stand-alone heat pump loop 54 and dedicated working fluid compressor 56. In this embodiment, a three-way-valve for sharing working fluid 52 with the cabin air conditioning system is not included. Heat transfer system 50' otherwise may be configured like heat transfer system 50 discussed herein to heat the charge air in intake 20.

A controller 100 is provided to receive data as input from various sensors, such as those discussed above and other sensors typically provided with an internal combustion engine system, and send command signals as output to various actuators. Some of the various sensors and actuators that may be employed are described in detail below. Any of the sensors can be real, physical sensors, or virtual sensors that derive output values from one or more operating parameters. The controller 100 can include a processor, a memory, a clock, and an input/output (I/O) interface.

The sensors that can be provided include those discussed above and/or temperature sensors to detect charge air temperature, a differential pressure sensor for the one or more aftertreatment devices 18, and temperature sensors which detect the exhaust gas temperature upstream and/or downstream or at an inlet and outlet, respectively, of the one or more aftertreatment devices 18. Examples include sensors 40, 42. Other sensors that can be provided include pressure and/or temperature sensors associate with heat transfer system 50, 50' including for the working fluid 52 and/or heating fluid 64, such as sensors 90, 92, 94.

During operation, the controller 100 can receive information from the various sensors such as those listed above through the I/O interface, process the received information using the processor based on an algorithm stored in the memory, and then send command signals to the various actuators through the I/O interface. For example, the controller 100 can receive information regarding a temperature input, process the temperature input, and then based on the temperature input and control strategy, send a command signal to one or more actuators to increase the exhaust gas temperature in response to a thermal management condition. The thermal management condition can be, for example, a temperature condition, a cold start condition, a warm-up condition, a keep-warm condition, a desoot condition, and/or a regeneration condition.

The controller 100 can be configured to implement the disclosed thermal management method with system 10, 10'. In one embodiment, the disclosed method involves adjusting one or more operating conditions of heat transfer system 50, 50' in response to the thermal management condition to increase the exhaust gas temperature to achieve a target condition. The term "target condition" herein means a state of the system 10, 10' during operation, such as the state of the exhaust gas exiting cylinders 14, within the exhaust 16, or other location, and can include the temperature of the exhaust gas, a temperature of one or more components or locations of the one or more aftertreatment devices 18, a temperature of one or more components of the exhaust 16, and/or other exhaust 16 parameters.

The control procedures implemented by the controller 100 to achieve the one or more target conditions in response to the thermal management condition will now be described. In general, the procedures described in FIG. 5 are executed by a processor of controller 100 executing program instructions (algorithms) stored in the memory of the controller 100. The description below can be implemented with system 10, 10' and/or heat transfer system 50, 50'.

In certain embodiments, the system 10, 10' further includes a controller 100 structured to perform certain operations to control system 10, 10' in achieving one or more target conditions for the exhaust gas and/or charge air. In certain embodiments, the controller forms a portion of a processing subsystem including one or more computing devices having memory, processing, and communication hardware. The controller may be a single device or a distributed device, and the functions of the controller 100 may be performed by hardware or software on a non-transient computer readable storage medium. More specific descriptions of certain embodiments of controller operations are included in the section referencing FIG. 5.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

With reference to FIG. 5, in one embodiment, the disclosed procedure 500 initiates at operation 502 and can interpret or determine a thermal management condition, such as with respect to the exhaust gas and/or the one or more aftertreatment devices 18. The thermal management condition can be determined in response to one or more operating parameters of system 10, 10'. Operating parameters can be, for example, any temperature input, a temperature at the inlet or other portion or portions of the one or more aftertreatment devices 18, a pressure drop across the one or more aftertreatment devices 18, a time since a last regeneration event, a catalyst and/or filter loading condition, an amount or estimate of particulate matter emitted from engine 12 since a last regeneration event, or any or other condition indicative of aftertreatment device performance that, when deficient, can be remedied through increasing a temperature of the exhaust gas. The operating parameters can be indicative of any one or combination conditions, such as a cold start condition, a warm-up condition, a keep warm condition, a regeneration condition, hydrocarbon adsorption on the catalysts, soot or particulate accumulation, sulphur or other poisoning of one or more catalysts, and/or ammonia-sulphate based deposit accumulation.

In response to the interpretation or determination that a thermal management condition exists at operation 502, procedure 500 continues at operation 504 to heat the charge air 22 with working fluid 52 to achieve a target condition. As discussed above, the target condition can include, for example, at least one of a target temperature or target temperature range of the exhaust gas, or a target temperature or temperature range of one or more exhaust components and/or aftertreatment devices 18, a constituent in the exhaust gas, at least one of a target temperature or target temperature range of the intake 20 or charge air 22, or a target temperature or temperature range of one or more intake components and/or intake devices, and combinations of these. In one embodiment, the one or more target conditions to be obtained vary according to the type of thermal management condition that is indicated.

In an embodiment, procedure 500 includes determining a cold start, warm-up, keep warm, or regeneration condition in which a target temperature of the exhaust gas is below a threshold. In response to a compressor outlet temperature downstream of compressor 30 being below a threshold temperature, the CAC 24 is bypassed by actuating charge air three-way valve 34 to a bypass position. If the charge air temperature is still below a threshold after bypassing CAC 24, the working fluid three-way valve 76 in heat transfer system 50 is actuated to circulate working fluid 52 through the condenser 58 in CAC bypass 32, and working fluid compressor 56 is activated.

In an embodiment, the evaporator outlet temperature and pressure of evaporator 60 are monitored. If the thermal expansion valve 68 can be actively controlled, thermal expansion valve 68 is adjusted to control the superheating of working fluid 52 entering working fluid compressor 56 to a targeted superheat value.

In an embodiment, the compressor outlet temperature of charge air compressor 30 is monitored. Once the compressor outlet temperature exceeds a second threshold, the charge air three-way-valve 34 in intake 20 is actuated to direct the charge air 22 through CAC 24. Alternatively if charge air three-way valve 34 includes a proportional actuator, the charge air 22 flow through CAC 24 and CAC bypass 32 can be proportionately controlled until the target condition is reached.

Various aspects of the present disclosure are contemplated. For example, one aspect of the present disclosure includes a system for thermally managing an exhaust gas of an internal combustion engine including a plurality of cylinders. The system includes an exhaust for receiving the exhaust gas produced by combustion in the plurality of cylinders, and at least one aftertreatment device in the exhaust. The system also includes an intake that provides a charge air to the plurality of cylinders, the intake including a CAC for cooling the charge air. The system further includes a heat transfer system that is configured to heat the charge air in the intake by a heat exchange to the charge air from a working fluid that is circulated through the intake.

In an embodiment of the system, the working fluid receives heat from operation of the internal combustion engine, and the heat from operation of the engine is provided by one of an engine coolant and an engine oil. In an embodiment of the system, the exhaust includes an exhaust gas recirculation loop that recirculates exhaust gas to the intake downstream of the CAC.

In an embodiment of the system, the intake includes a CAC bypass for bypassing the charge air around the CAC, and a compressor upstream of the CAC and the CAC bypass. In a refinement of this embodiment, the intake includes a three-way valve connecting an outlet of the compressor to the CAC and the CAC bypass. In another refinement, the intake includes a two-way valve in the CAC bypass.

In yet another refinement of the above embodiment, the intake includes a first two-way valve in a leg of the intake that includes the CAC and a second two-way valve in the CAC bypass. In still a further refinement of the embodiment, the intake includes a throttle downstream of the CAC and the CAC bypass. In a further refinement of the embodiment, the heat transfer system is configured to circulate the working fluid through the CAC bypass.

In another embodiment of the system, the heat transfer system includes a working fluid compressor for compressing the working fluid, a condenser in the intake to transfer heat from the working fluid to the charge air, and an evaporator to transfer heat to the working fluid.

In a refinement of the above embodiment, the heat transfer system includes a thermal expansion valve between the condenser and the evaporator. In another refinement, the heat transfer system includes a second condenser to transfer heat from the working fluid to the environment, and a second evaporator to transfer cool air flow to an air conditioned space. In a still further refinement, the heat transfer system includes a three-way valve connecting an outlet of the working fluid compressor with the condenser in the intake and the second condenser.

In an embodiment of the system, the intake includes an intake manifold and the heat transfer system is configured to circulate the working fluid through the intake manifold. In an embodiment of the system, the working fluid is a refrigerant or a hydrocarbon fluid.

According to another aspect of the present disclosure, a method of thermally managing an internal combustion engine that includes a plurality of cylinders and an aftertreatment device in an exhaust is provided. The method includes operating the internal combustion engine to receive a charge air from an intake and produce an exhaust gas by combustion in at least a portion of the plurality of cylinders; determining a thermal management condition associated with operation of the internal combustion engine; and heating the charge air in the intake by a heat exchange to the charge air from a working fluid that is circulated through the intake in response to the thermal management condition.

In an embodiment, the method includes transferring heat generated by operation of the internal combustion engine to the working fluid before heating the charge air. In a refinement of this embodiment, the method includes compressing the heated working fluid before heating the charge air; condensing the heated working fluid in the intake with the charge air; and evaporating the condensed working fluid with the heat from operation of the internal combustion engine. In a further refinement of this embodiment of the method, compressing the heated working fluid includes driving a working fluid compressor by operation of the internal combustion engine.

In an embodiment, the method includes bypassing at least a portion of the charge air around a CAC in the intake; and heating the bypassed charge air with the working fluid. In a refinement of this embodiment, bypassing at least a portion of the charge air includes: completely bypassing the CAC in response to an intake temperature being below a first threshold; and partially bypassing the CAC in response to the intake temperature being above a second threshold.

According to another aspect of the present disclosure, a heat transfer system for heating a charge air in an intake of an internal combustion engine is provided. The heat transfer system includes charge air plumbing configured to provide the charge air to the intake of the internal combustion engine, and a heat pump loop configured to circulate a working fluid to heat the charge air in the charge air plumbing.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system for thermally managing an exhaust gas of an internal combustion engine including a plurality of cylinders, the system comprising:
    an exhaust for receiving the exhaust gas produced by combustion in the plurality of cylinders, and at least one aftertreatment device in the exhaust;
    an intake that provides a charge air to the plurality of cylinders, the intake including a charge air cooler (CAC) for cooling the charge air; and
    a heat transfer system that is configured to heat the charge air in the intake by a heat exchange to the charge air from a working fluid that is circulated through the intake, wherein the heat transfer system includes:
        a working fluid compressor for compressing the working fluid;
        a first condenser in the intake to transfer heat from the working fluid to the charge air and a second condenser to transfer heat from the working fluid to the environment;
        a first evaporator to transfer heat to the working fluid and a second evaporator to transfer cool air flow to an air conditioned space; and
        wherein working fluid flow from an outlet of the working fluid compressor is regulated to the first condenser and the second condenser.

2. The system of claim 1, wherein the working fluid receives heat from operation of the internal combustion engine, and the heat from operation of the engine is provided by one of an engine coolant and an engine oil.

3. The system of claim 1, wherein the intake includes:
    a CAC bypass for bypassing the charge air around the CAC; and
    a compressor upstream of the CAC and the CAC bypass.

4. The system of claim 3, wherein the intake includes a three-way valve connecting an outlet of the compressor to the CAC and the CAC bypass.

5. The system of claim 3, wherein the intake includes a two-way valve in the CAC bypass.

6. The system of claim 3, wherein the intake includes a first two-way valve in a leg of the intake that includes the CAC and a second two-way valve in the CAC bypass.

7. The system of claim 3, wherein the intake includes a throttle downstream of the CAC and the CAC bypass.

8. The system of claim 3, wherein the heat transfer system is configured to circulate the working fluid through the CAC bypass.

9. The system of claim 1, wherein the exhaust includes an exhaust gas recirculation loop that recirculates exhaust gas to the intake downstream of the CAC.

10. The system of claim 1, wherein the working fluid is a refrigerant or a hydrocarbon fluid.

11. The system of claim 1, wherein the heat transfer system includes a thermal expansion valve between the first condenser and the first evaporator.

12. The system of claim 1, further comprising
a three-way valve connecting the outlet of the working fluid compressor with the first condenser and the second condenser.

13. The system of claim 1, wherein the intake includes an intake manifold and the heat transfer system is configured to circulate the working fluid through the intake manifold.

14. A heat transfer system for heating a charge air in an intake of an internal combustion engine, the heat transfer system comprising:
charge air plumbing configured to provide the charge air to the intake of the internal combustion engine; and
a heat pump loop configured to circulate a working fluid to heat the charge air in the charge air plumbing, wherein the heat pump loop includes a first condenser in the intake to transfer heat from the working fluid to the charge air and a first evaporator to transfer heat to the working fluid;
a cabin air conditioning loop including a second condenser to transfer heat from the working fluid to the environment and a second evaporator to transfer cool air flow to an air conditioned space;
a working fluid compressor for compressing the working fluid; and
wherein working fluid flow from an outlet of the working fluid compressor is regulated to the first condenser and the second condenser.

15. The heat transfer system of claim 14, wherein the heat pump loop and the cabin air conditioning loop share the working fluid compressor.

16. The heat transfer system of claim 14, further comprising a three-way valve connecting the outlet of the working fluid compressor to the first condenser and the second condenser.

* * * * *